United States Patent [19]
Smith, Jr. et al.

[11] Patent Number: 5,417,768
[45] Date of Patent: May 23, 1995

[54] METHOD OF CLEANING WORKPIECE WITH SOLVENT AND THEN WITH LIQUID CARBON DIOXIDE

[75] Inventors: Charles W. Smith, Jr.; Larry R. Rosio, both of Fairview; Stephen H. Shore, Erie, all of Pa.

[73] Assignee: Autoclave Engineers, Inc., Erie, Pa.

[21] Appl. No.: 167,403

[22] Filed: Dec. 14, 1993

[51] Int. Cl.⁶ .................. B08B 3/08; B08B 3/12
[52] U.S. Cl. ........................ 134/10; 134/11; 134/26; 134/30; 134/95.1; 134/109
[58] Field of Search .............. 134/1, 10, 11, 26, 30, 134/95.1, 109, 184

[56] References Cited

U.S. PATENT DOCUMENTS

| | | | |
|---|---|---|---|
| 4,750,505 | 6/1988 | Inuta et al. | 134/95.1 X |
| 4,788,043 | 11/1988 | Kagiyama et al. | 422/292 |
| 4,832,753 | 5/1989 | Cherry et al. | 134/22.18 |
| 4,936,922 | 6/1990 | Cherry | 134/22.18 |
| 4,990,260 | 2/1991 | Pisani | 210/664 |
| 5,013,366 | 5/1991 | Jackson et al. | 134/1 |
| 5,073,203 | 12/1991 | Al-Ghatta | 134/11 |
| 5,102,504 | 4/1992 | Saito | 134/184 X |
| 5,306,350 | 4/1994 | Hoy et al. | 134/11 X |
| 5,339,844 | 8/1994 | Stanford, Jr. et al. | 134/107 |

*Primary Examiner*—Scott Kastler
*Assistant Examiner*—Saeed Chaudhry
*Attorney, Agent, or Firm*—Webb Ziensenheim Bruening Logsdon Orkin & Hanson

[57] ABSTRACT

A method for precision cleaning of a workpiece with a cleaning fluid comprising liquid and/or supercritical fluid carbon dioxide and a primary solvent which is liquid at ambient temperatures and pressures comprises first placing the workpiece in a pressurizable vessel with a removable lid and within an inner tank open at the top; supplying the primary solvent to the inner tank; flushing the primary solvent through the pressure vessel; draining the inner tank to remove the primary solvent; and then supplying liquid and/or supercritical fluid carbon dioxide to the pressure vessel and flushing it through the vessel by withdrawing it from near the bottom of the inner tank.

12 Claims, 1 Drawing Sheet

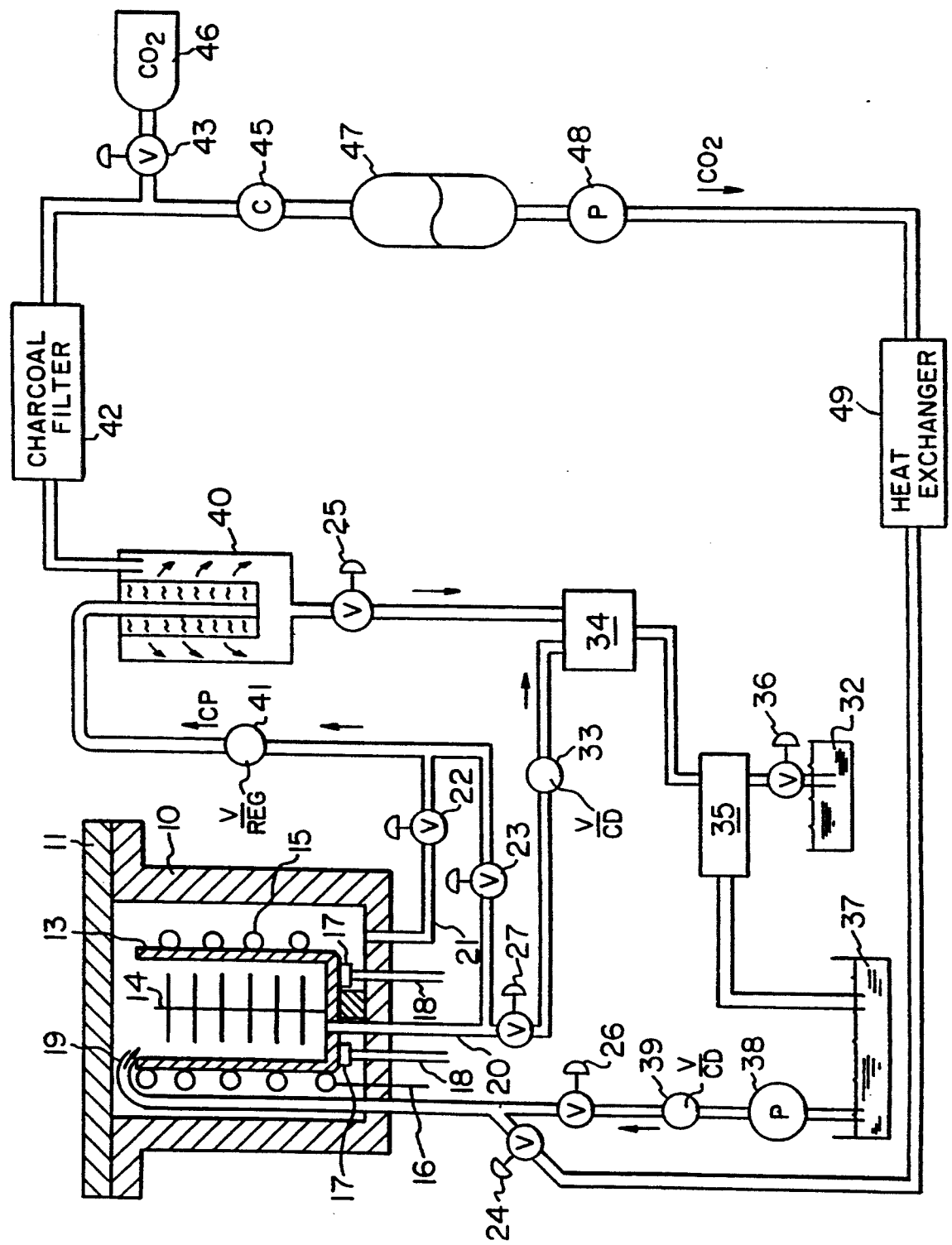

METHOD OF CLEANING WORKPIECE WITH SOLVENT AND THEN WITH LIQUID CARBON DIOXIDE

FIELD OF THE INVENTION

This invention relates to precision cleaning and, in particular, with the use of a cleaning fluid comprising liquid or supercritical fluid carbon dioxide.

BACKGROUND OF THE INVENTION

In the art of precision cleaning, it is necessary to remove liquids and solids from surfaces of workpieces leaving high purity surfaces. Precision cleaning involves the use of solvents and often more than one solvent. Since the workpiece surface can be no cleaner than the cleanliness of the solvents used to clean it, it is necessary to flush solvents through the cleaning chamber in precision cleaning methods.

As a practical matter in precision cleaning methods, solvents must be recycled. Their initial cost is not insignificant nor is the cost of disposing contaminated solvents.

It is often the case that more than one type of solvent is required for precision cleaning because the solvents tend to be selective of the liquids and solids taken into solution. Cleaning with mixed cosolvents simultaneously applied to the workpiece has been considered. This results in the major contamination of one solvent with another making the recycling of either solvent more complicated.

A cleaning fluid comprising liquid or supercritical carbon dioxide has been found to be an excellent solvent because of its ability to take into solution a range of solid and liquid contaminants and because it can be recycled in a separation stage during which it is depressurized to permit it to vaporize. However, no vapor separation process is perfect and the product of the separation depends upon the degree and type of contamination.

Some very small particles cannot be dislodged from the workpiece surface unless the solvent in contact therewith is agitated as by ultrasound applied to the solvent and for very small particles unless agitation as by ultrasound vibrations is directly applied to the workpiece. Some liquid solvents in contact with certain piezoelectric materials cause them to degrade. Hence, it is desirable to isolate the piezoelectric transducers from those liquid solvents.

It is an advantage, according to this invention, to provide precision cleaning of a workpiece or workpieces in which the liquid and/or supercritical fluid carbon dioxide is used in combination with another solvent and/or other solvents but without major intermixing of solvents that is a drawback to recycling of the carbon dioxide.

It is a further advantage, according to this invention, to provide precision cleaning of a workpiece or workpieces in which liquid and/or supercritical fluid carbon dioxide is used in combination with another solvent or other solvents and ultrasound can be applied to either the solvents or workpiece without damaging the piezoelectric materials.

It is yet another advantage, according to this invention, to provide precision cleaning with a liquid solvent followed by the cleaning with a cleaning fluid comprising liquid or supercritical fluid carbon dioxide while minimizing the intermixing of the liquid solvent and the cleaning fluid and thereby eliminating the disadvantages therewith.

SUMMARY OF THE INVENTION

Briefly, according to this invention, there is provided a method for precision cleaning of a workpiece with a cleaning fluid comprising liquid and/or supercritical fluid carbon dioxide and a primary solvent which is liquid at ambient temperatures and pressures. The method comprises placing the workpiece in a pressurizable vessel with a removable lid and within an inner tank open at the top. After the lid is closed, the primary solvent is supplied to the inner tank without contaminating the interior walls of the pressurizable vessel. Then, the primary solvent is flushed through the pressure vessel without contaminating the interior walls of the pressure vessel. The inner tank is drained to remove the primary solvent. A secondary solvent or cleaning fluid comprising liquid or supercritical fluid carbon dioxide is added to the pressure vessel and is flushed through the vessel by withdrawing it from near the bottom of the inner tank. The cleaning fluid is also recycled. At the end of the cleaning, cleaning fluid is withdrawn from the inner tank and from a location in the vessel outside of the tank.

According to a preferred method, ultrasound vibrations are applied through the walls of the inner tank to the primary solvent and/or to the workpiece to shake free very fine particles.

Also, according to this invention, there is provided a system for precision cleaning of a workpiece with a cleaning fluid comprising liquid and/or supercritical fluid carbon dioxide and a primary solvent which is liquid at ambient temperatures and pressures. The system comprises a pressurizable vessel with a removable lid. An open top inner tank is positioned within the pressure vessel and defines a workspace into which a workpiece can be placed. A primary solvent supply tank, pump and an inlet conduit passing into the pressure vessel and opening into the top of the inner tank are arranged to supply the primary solvent to the inner tank without contaminating the interior walls of the pressurizable vessel. An outlet conduit passing into the pressure vessel and opening up through the bottom of the inner tank is arranged to withdraw the primary solvent from the inner tank without contaminating the inner walls of the pressure vessel. The above-described conduits and pump enable the primary solvent to be flushed through the pressure vessel and the inner tank to be drained of the primary solvent. Preferably, distillation apparatus are positioned between the outlet and inlet conduits to permit the primary solvent to be recycled. A supply tank, pump and inlet conduit passing through the pressure vessel enable the supply of liquid or supercritical fluid carbon dioxide to the pressure vessel. The inlet conduit for the cleaning fluid may be the same as the inlet conduit for the primary solvent. The above-described conduits and pump enable liquid or supercritical carbon dioxide to be flushed through the vessel drawing the liquid or supercritical fluid carbon dioxide from the interior of the tank. A separator is arranged between the inlet and outlet conduits to separate the carbon dioxide flushed through the vessel from contaminants by lowering the pressure thereof, vaporizing and repressurizing. While the primary solvent and cleaning fluid flushing circuits may comprise some of the same elements, the apparatus for performing the distillation of the primary solvent and separating the cleaning fluid from contaminants are different. Conduits are provided for simultaneously withdrawing carbon dioxide from the tank from a location in the vessel outside of the tank.

According to a preferred embodiment, a power supply and piezoelectric transducers are provided for applying ultrasound to the primary solvent and/or the workpiece within the inner tank. The piezoelectric transducers are attached to the exterior of the inner tank.

According to another preferred embodiment, an adsorption media filter, such as an activated charcoal filter, purifies the carbon dioxide vapor from the separator significantly improving the degree of cleanliness that can be achieved on the surface of the workpiece.

According to a preferred embodiment of the method disclosed herein, during the flushing of the carbon dioxide through the pressure vessel, the temperature of the carbon dioxide is increased to lower the density of the carbon dioxide as the contamination level of the carbon dioxide in the vessel is reduced thereby reducing the amount of carbon dioxide required for the completion of the cleaning operation and decreasing the time for the carbon dioxide rinse.

THE DRAWING

Further features and other objects and advantages of this invention will become clear to those skilled in the art from the following detailed description made with reference to the drawing which is a schematic diagram of a system according to this invention.

DESCRIPTION OF THE PREFERRED EMBODIMENTS

Referring to the drawing, a pressure vessel 10 with a removable cover 11 is sized to contain fluids at pressures from 1,000 to 5,000 psi at temperatures up to 500° F. Typically, the vessel will have a circular cylindrical side wall and an axial end face at the bottom. The cover 11 is a plate covering the upper open end and is arranged to be pressure sealed to the pressure vessel. Within the vessel is an inner tank 13 which is typically cylindrical with a closed axial bottom and an open top. An annular space is defined by the inner tank and the interior wall of the pressure vessel. Within the tank and fixed or releasably secured to the bottom is a rack 14 for supporting workpieces to be cleaned. An electrical heating element 15 is wrapped around the inner tank. Electric leads 16 which supply electrical current to the heating element extend through the bottom of the pressure vessel through pressure-tight seals.

Piezoelectric transducers 17 are attached to the exterior of the inner tank with electrical leads 18 extending through the bottom of the pressure vessel through pressure-tight seals.

An inlet conduit 19 passes through the bottom of the pressure vessel and up to near the top of the pressure vessel where it opens to deliver liquids to the interior of the inner tank. An outlet conduit 20 drains the inner tank from the bottom thereof through the bottom of the pressure vessel. A second outlet conduit 21 through the bottom of the pressure vessel opens to the bottom of the pressure vessel.

When valves 22, 23 and 24 prevent flow through the conduits in which they are inserted, the recycling circuit (yet to be described) for the cleaning fluid comprising liquid or supercritical fluid carbon dioxide is isolated from the pressure vessel. When the valves 26 and 27 are opened to permit flow through the conduit into which they are inserted, the primary solvent recycling circuit (next to be described) is placed in communication with the inner tank in the pressure vessel.

The primary solvent recycling circuit comprises a check valve 33 in communication with the bottom of the inner tank through outlet conduit 20 and valve 27. Liquid passing the check valve enters the spent solvent reservoir 34. From the spent solvent reservoir 34, the contaminated primary solvent is drawn into still 35 where it is vaporized and condensed with the residue being drained through valve 36 to residue tank 32. The distilled solvent is emptied to clean solvent reservoir 37 from which it can be pumped by pump 38 through check valve 39 to the pressure vessel.

The cleaning fluid recycling circuit comprises a separator 40 to which the pressurized cleaning fluid from the pressure vessel is directed through let-down valve 41. In the separator, the carbon dioxide vaporizes and passes to the charcoal filter 42. The liquid solvent and contaminants gather at the bottom of the separator and are drained through valve 25 from time to time to the spent solvent reservoir 34. The charcoal filter removes solvents and contaminants carried over from the separator and returns substantially pure carbon dioxide to the compressor 45. Make up carbon dioxide may be supplied from supply tank 46 through valve 43 to the compressor. The compressor 45 feeds the liquid carbon dioxide reservoir 47. From the reservoir 47, cleaning fluid can be pumped by constant volume pump 48 through the heat exchanger 49 where its temperature may be raised to supercritical conditions and thence to the pressure vessel. The heat exchanger may be omitted and the heating element 15 within the vessel may be used to obtain supercritical conditions.

OPERATION

In operation, the workpieces to be cleaned are placed on the rack in the inner tank. The lid is installed and the vessel purged with carbon dioxide to remove moisture held in the atmosphere which filled the tank prior to purging. After the purge, the inner tank is filled with the primary solvent. Ultrasound may be applied to the solvent through the wall of the inner tank. Note that the piezoelectric transducers are not in contact with the solvent and, therefore, are not subject to deterioration that might be caused by such contact. The workpieces themselves may be agitated by the application of ultrasound to the inner tank in a way to be transmitted through the rack and to the workpieces. This action is essential for shaking loose the very finest particles from the surfaces of the workpieces. During the cleaning with the liquid solvent, the solvent may be flushed through the tank to carry away contaminated solvent. Thereafter, the inner tank is drained. However, a thin layer of contaminated liquid solvent remains on the surfaces of the workpieces and on the walls of the inner tank.

Now, the liquid solvent recycling circuit is isolated from the pressure vessel by closing of valves 26 and 27 and the cleaning fluid circuit is placed in communication with the pressure vessel by opening valves 23 and 24. The pressure vessel is then pressurized with the cleaning fluid comprising liquid or supercritical fluid carbon dioxide. The ultrasound can be applied both to the cleaning fluid or the workpiece through the rack. Now, the liquid carbon dioxide fills the entire pressure vessel and is not simply confined in the inner tank. During flushing, however, contaminated cleaning fluid is withdrawn from the bottom of the inner tank minimizing the contamination of the pressure vessel walls. The flushing with the cleaning fluid removes the layer of solvent left on the surfaces of the workpieces and further removes substances that were not dissolved by the liquid solvent but are soluble in the cleaning fluid.

As the surfaces of the workpiece or workpieces can only be as free from contaminants as the cleaning fluid being flushed through the vessel is free of contaminants, it is essential for achieving the highest degree of cleanliness to place an adsorption media filter, such as an activated charcoal filter, in the cleaning fluid recycling circuit to further purify the cleaning fluid. The solid-liquid separation action of the separator is limited due to covaporization, entrainment and solution of contaminants in the vaporized cleaning fluid. This contamination can be removed or reduced by the use of an adsorption media filter.

Where, as is often the case, flushing with carbon dioxide only removes the residue of the primary solvent, the residue will be a relatively small volume in comparison with the volume of carbon dioxide being flushed through the tank. Once the primary solvent is removed into the carbon dioxide, it should be removed as soon as possible from the vessel. This is accomplished by multiple exchanges of the carbon dioxide in the vessel.

Now, the lower the density of the carbon dioxide, the faster it can be flushed through the vessel. The pump 48, for example, is a constant volume pump pumping carbon dioxide at a density of sixty pounds per cubic foot (at temperatures around 0° C. and pressures up to 3,000 psi). As the carbon dioxide passes through the heat exchanger 49, its temperature is at least raised above the critical temperature to about 25° C. The density of the carbon dioxide drops and therefore the volume rate of flow increases. If the temperatures is raised even higher, the density drops even more and the volume rate of flow increases still further. Hence, by increasing the temperature of the carbon dioxide in the heat exchanger above 25° C., the rate at which the volume of carbon dioxide is exchanged in the vessel is increased.

At pressures below about 1,500 psi, which are the pressures practically employed, as the density of the carbon dioxide decreases, so does its ability to take the primary solvent or other contaminants into solution. In other words, its capacity for holding contaminants in solution decreases. Therefore, it is desirable to start flushing carbon dioxide through the vessel at the highest density possible for supercritical fluids at the given pressure (that is, at temperatures just above 25° C.) and then increasing the temperature during subsequent exchanges. This can be accomplished by controlling the temperature of the carbon dioxide as it emerges from the heat exchanger. During the last exchange, the temperature of the carbon dioxide may be lowered again to cool the workpiece and thus to facilitate handling after the vessel is emptied and opened.

It should be understood that the carbon dioxide flushing process is a continuous process and not a batch process. Hence, the exchanges of carbon dioxide referred to are not discrete exchanges but gradual exchanges.

When flushing is completed, the pressure vessel is drained both from the inner tank and also from the bottom of the pressure vessel by the opening of valve 21. In this way, the tendency for carbon dioxide to freeze in the bottom of the inner tank is minimized. The heater 15 helps to prevent this occurrence also.

The solvent referred to as "primary solvent" is referred to that way simply because it is usually the first solvent to remove contaminants from the contaminated specimen. Examples of primary solvents are organic solvents, such as acetone, isopropyl alcohol and Axarel ®, a product of DuPont. Other solvents which can be wholly or partially "rinsed" away by the liquid or supercritical fluid carbon dioxide may also be used as primary solvents.

Having thus described our invention in the detail and particularity required by the Patent Laws, what is claimed and desired protected by Letters Patent is set forth in the following claims.

We claim:

1. A method for precision cleaning of a workpiece comprising the steps of:
   placing the workpiece in a pressurizable vessel with a removable lid and within an inner tank open at the top
   supplying a primary solvent to the inner tank which is liquid at ambient temperatures and pressures and which can be rinsed away by carbon dioxide pressurized to at least liquefying pressures without contaminating the interior walls of the pressurizable vessel;
   flushing the primary solvent through the pressure vessel without contaminating the interior walls of the pressure vessel;
   draining the inner tank to remove the primary solvent;
   supplying carbon dioxide to the pressure vessel pressurized to at least liquefying pressures and flushing it through the vessel by withdrawing it from near the bottom of the inner tank;
   recycling the carbon dioxide by passing it through a let-down valve to a liquid/vapor separator and then passing the vaporized carbon dioxide through an adsorption media filter prior to recondensing to a liquid; and
   simultaneously withdrawing carbon dioxide from the tank and from a location in the vessel outside of the tank.

2. The method according to claim 1 further comprising a step of applying ultrasound vibrations to the primary solvent through the walls of the inner tank.

3. The method according to claim 1 further comprising a step for agitating the workpiece.

4. The method according to claim 1 further comprising a step for applying ultrasound vibrations to the workpiece via the walls of the inner tank.

5. The method according to claim 1 wherein the adsorption media is activated charcoal.

6. The method according to claim 1 further comprising means for applying ultrasound vibrations to a workpiece when positioned in the inner tank via the walls of the inner tank.

7. The method according to claim 1 wherein during the flushing of the carbon dioxide through the pressure vessel the temperature of the carbon dioxide is increased to lower the density of the carbon dioxide as the contamination level of the carbon dioxide in the vessel is reduced.

8. A system for precision cleaning out of a workpiece with a cleaning fluid comprising carbon dioxide pressurized to at least liquefying pressures and a primary solvent which is liquid at ambient temperatures and pressures comprising a pressurizable vessel with a removable lid;

an inner tank open at the top defining a workspace into which the workpiece can be placed, said inner tank positioned within the pressure vessel;

means to supply the primary solvent to the inner tank without contaminating the interior walls of the pressurizable vessel;

means to withdraw the primary solvent from the inner tank without contaminating the inner walls of the pressure vessel;

means to flush the primary solvent through the pressure vessel and then to drain the tank including means to recycle the primary solvent;

means to supply carbon dioxide pressurized to at least liquefying pressures to the pressure vessel;

means to flush carbon dioxide pressurized to at least liquefying pressures through the vessel drawing the carbon dioxide from the interior of the tank;

means to separate the carbon dioxide flushed through the vessel from contaminants by lowering the pressure thereof, vaporizing and repressurizing; and, means to simultaneously withdraw carbon dioxide from the tank and from a location in the vessel outside of the tank.

9. A system according to claim 8 further comprising means for applying ultrasound to the primary solvent within the inner tank.

10. A system according to claim 8 further comprising means to agitate a workpiece when positioned within the inner tank.

11. A system according to claim 8 wherein the means to separate further comprises an adsorption media filter for purifying the vaporized carbon dioxide.

12. A system according to claim 11 wherein the filter is an activated charcoal filter.

* * * * *

UNITED STATES PATENT AND TRADEMARK OFFICE
CERTIFICATE OF CORRECTION

PATENT NO. : 5,417,768
DATED : May 23, 1995
INVENTOR(S) : Charles W. Smith, Jr., Larry R. Rosio and Stephen H. Shore It is certified that error appears in the above-indentified patent and that said Letters Patent is hereby corrected as shown below:

Claim 1 Line 21 Column 6 after "top" insert --;--.

Claim 8 Line 65 Column 6 after "cleaning" delete --out--.

Signed and Sealed this

Twelfth Day of September, 1995

*Attest:*

BRUCE LEHMAN

*Attesting Officer*  *Commissioner of Patents and Trademarks*